United States Patent [19]

Cook

[11] 4,350,895

[45] Sep. 21, 1982

[54] WIND TURBINE AND METHOD FOR POWER GENERATION

[75] Inventor: Gregory E. Cook, Lisle, Ill.

[73] Assignee: Windpowered Machines Ltd., Warrenville, Ill.

[21] Appl. No.: 125,934

[22] Filed: Mar. 3, 1980

[51] Int. Cl.³ .............................................. F03D 5/04
[52] U.S. Cl. ..................................... 290/55; 416/142; 416/189; 416/240
[58] Field of Search ....................... 290/43, 44, 54, 55; 416/DIG. 4, 132 A, 132 B, 142 B, 240 A, DIG. 6, 189 A, 196 A; 60/398, 420, 709, 720; 114/102-112, 213-217

[56] References Cited

U.S. PATENT DOCUMENTS

| 666,908 | 1/1901 | Register | 416/DIG. 6 |
| 1,015,416 | 1/1912 | Bennett | 416/194 |
| 1,183,219 | 5/1916 | Manikowske | 290/44 |
| 2,197,654 | 4/1940 | Beaudry | 114/107 |
| 2,243,156 | 5/1941 | Howe et al. | 60/720 |
| 3,438,349 | 4/1969 | Curtis et al. | 114/102 |

FOREIGN PATENT DOCUMENTS

| 211360 | 2/1956 | Australia | 416/189 A |
| 2642570 | 3/1978 | Fed. Rep. of Germany | 416/132 B |
| 2758180 | 6/1979 | Fed. Rep. of Germany | 416/DIG. 4 |
| 182740 | 7/1922 | United Kingdom | 416/240 A |

*Primary Examiner*—J. V. Truhe
*Assistant Examiner*—Shelley Wade
*Attorney, Agent, or Firm*—Jacques M. Dulin

[57] ABSTRACT

A wind turbine for generation of electricity comprising a large, lightweight wheel attached to a fixed vertical central pylon and oriented to rotate in a vertical plane around a boom having an axis that is substantially horizontal, and pivoted at one end to the pylon. The wind wheel is supported at its rim by a carriage assembly that is constrained to move in a circular horizontal path about the central pylon. The wheel has a cylindrical outer rim and may include one or more perimeter frame structures. The outer surface of the rim is essentially flat in cross section and presents a traction surface for the takeoff of energy from the rim of the wheel. The wheel has a plurality of uniformly spaced radial spindles on which are rolled sails (soft airfoils), which when unfurled catch the wind to provide the rotational motion to the wheel. The carriage assembly may be moved around the pylon by driver means to accommodate for changes in wind direction, or the wind wheel as a whole can be allowed to move freely to assume the preferred wind direction in the manner of a weather vane. The wheel and frame structure are secured to and supports the horizontal boom which lies colinear with the axis of the wheel and projects longitudinally in both directions from the central plane of the wheel. The entire boom structure is supported by means of stays from the perimeter of the rim to the ends of the boom. Detailed rigging and traveler assemblies for control and operation of the wind turbine are disclosed.

20 Claims, 9 Drawing Figures

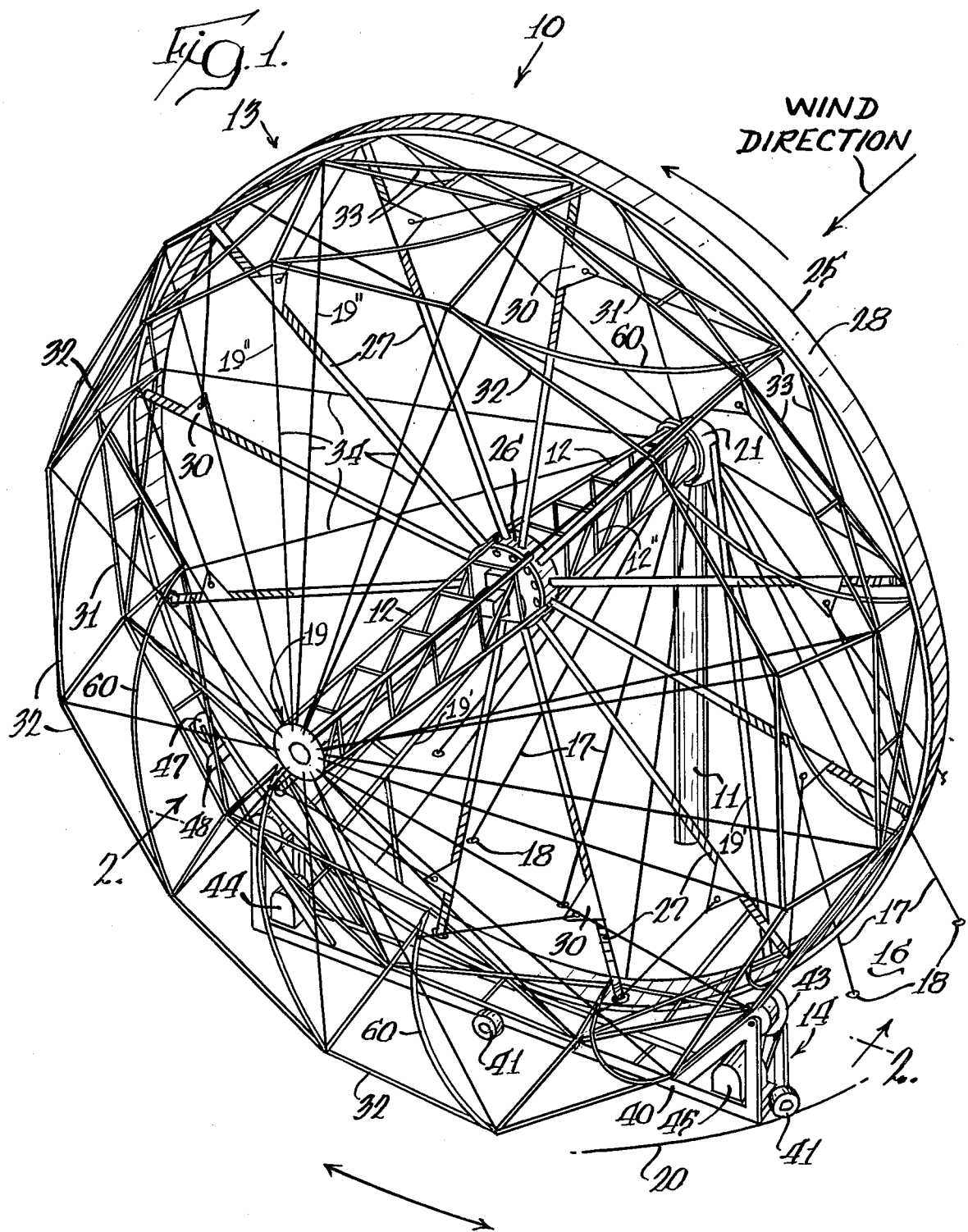

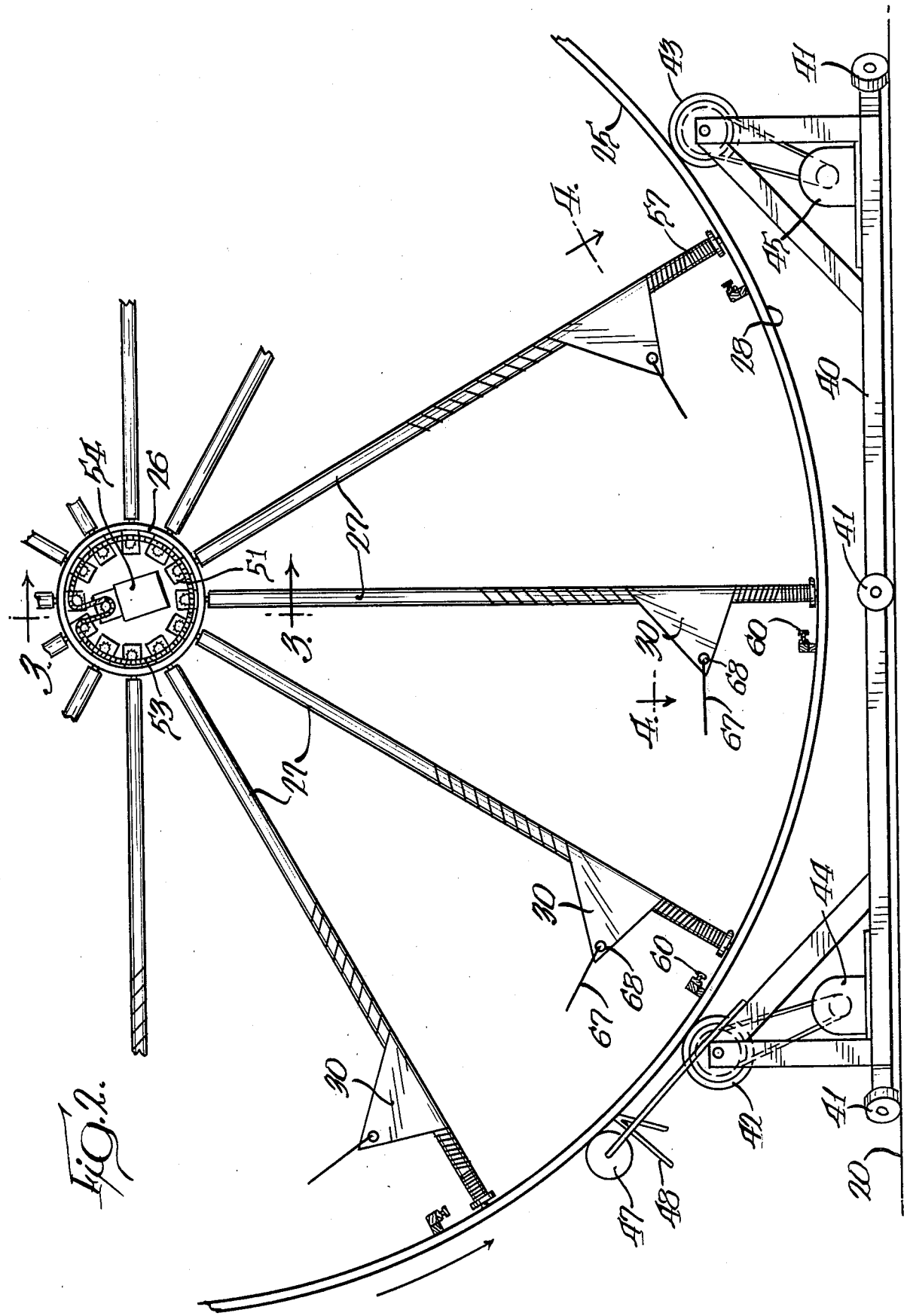

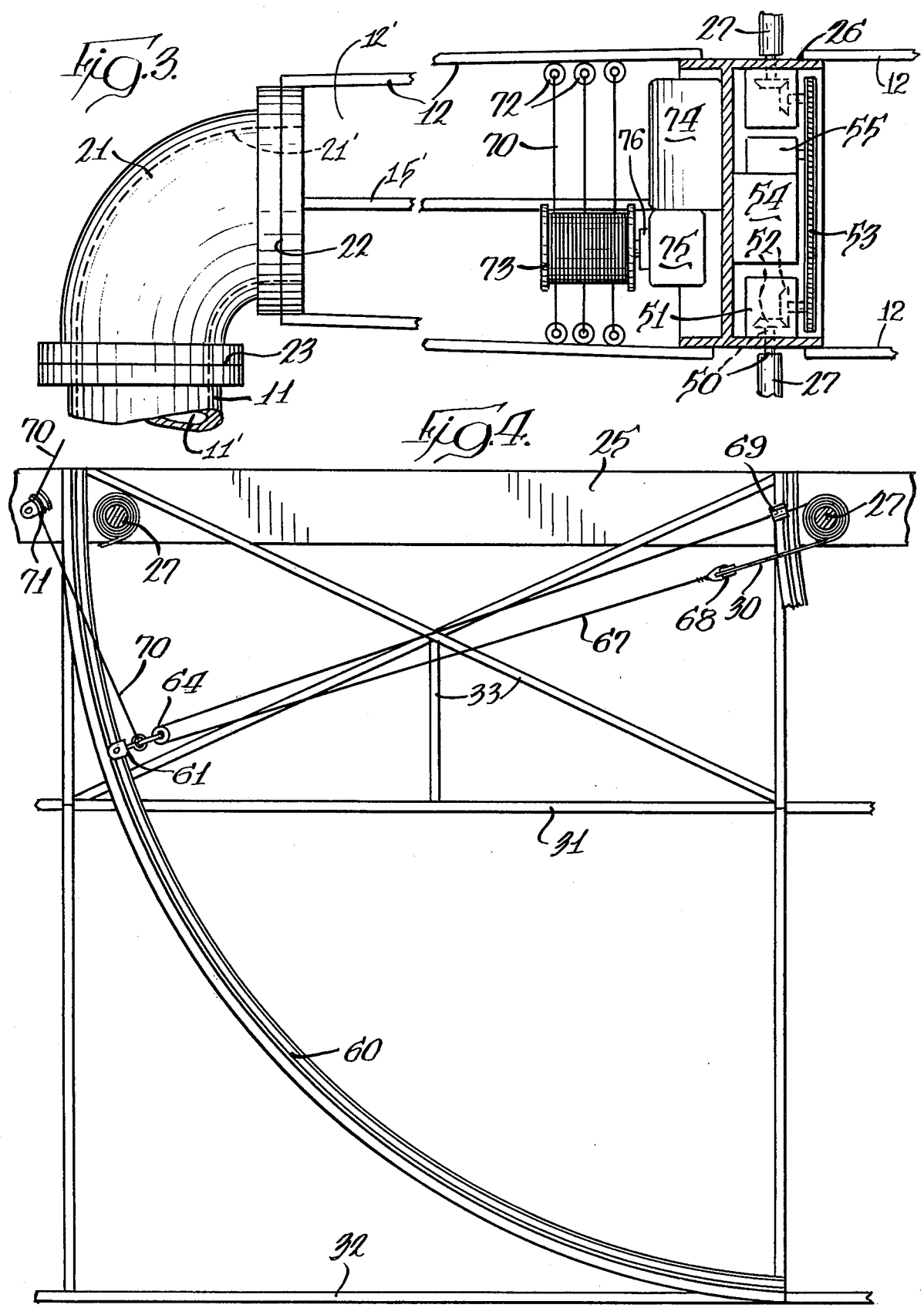

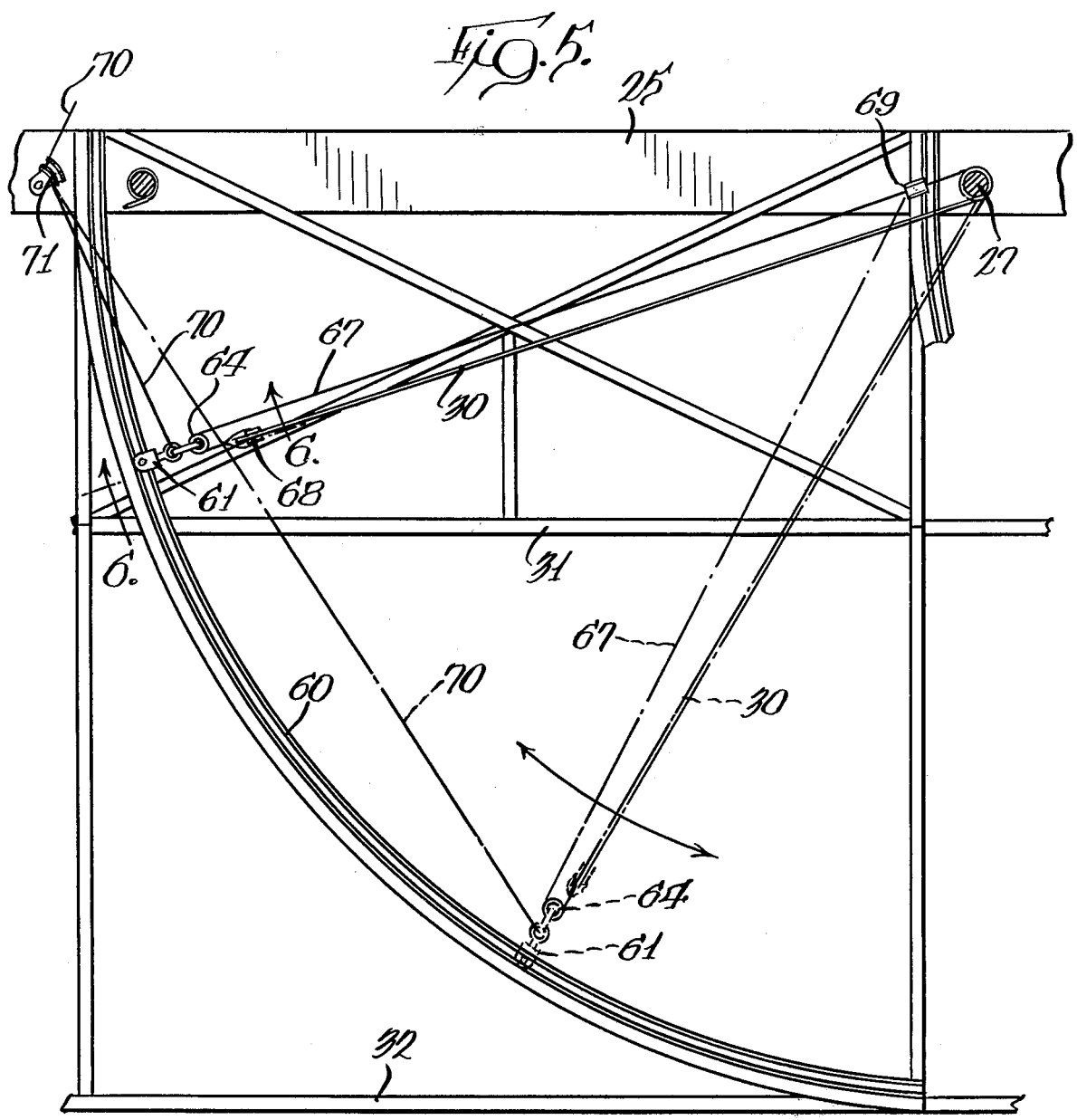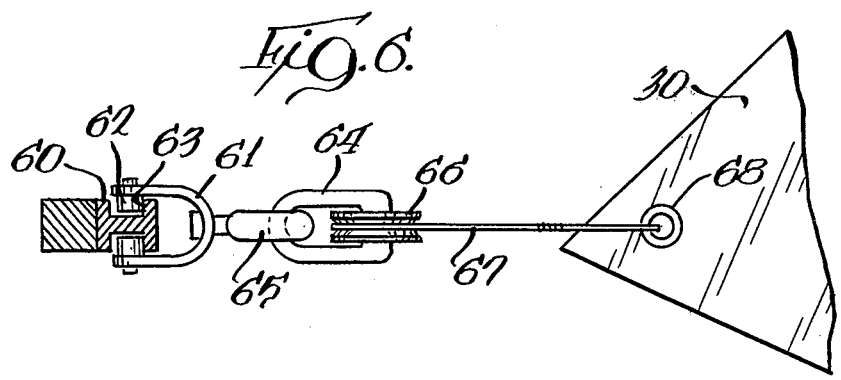

WIND TURBINE AND METHOD FOR POWER GENERATION

SUMMARY OF THE INVENTION

1. Field of the Invention

This invention relates generally to wind driven energy machines for generating electricity, and more particularly to a wind turbine comprising a large wheel assembly having a plurality of radially mounted sails.

2. A Brief Description of the Prior Art

Wind driven power sources, such as windmills are of ancient origin and have been used generally in areas where other sources of energy were unavailable or as yet undeveloped. Such devices have been used in the Netherlands and elsewhere in the world to operate grist mills and throughout rural America for operating pumps and the like. With the cost of other forms of energy continually increasing, the use of wind on an expanded scale is being considered seriously as an alternative source of energy.

The kinetic energy present in the wind is a function of its velocity, its mass and the cross sectional area traversed by the wind. In general terms, with a wind speed of a little more than 30 miles per hour, the net wind power crossing a square meter of area is approximately two kilowatts. This means that to harness a significant amount of energy, the area presented transversely to the wind stream must be relatively large. Increasing the surface area of the windmill to capture this additional energy, generally increases the overall weight and the size of the supporting structure. Most commonly, it has been found that the cost, weight, and lateral forces on the supporting structure increase disproportionately with energy capturing capability of the windmill.

A number of relatively large scale wind energy machines have been disclosed in the prior patent art. These devices are exemplified by the following patents:

| Number | Inventor | Title |
| --- | --- | --- |
| 835,667 | J. J. Donnelly | Wind Motor |
| 997,819 | J. P. Holmes | Propeller Wheel |
| 1,010,337 | A. Wunderlich | Screw Propeller for Flying Machines |
| 1,015,416 | J. A. Bennett | Wind Wheel |
| 1,115,162 | E. Berliner | Aeromoblile |
| 4,134,708 | B. O. Brauser et al | Wind Driven Electric Power Plant |

The patent to Donnelly discloses a device having a plurality of reefable sails and is mounted to rotate in a vertical plane about a horizontal axis. All of the weight and thrust loads acting against the wind wheel are taken by the axle supporting the wind wheel. In this patent the sail outhaul lines rewind on the next mast in the assembly.

The patent to Bennett shows a large wind wheel oriented to rotate in a vertical plane about a horizontal axle. The axle is supported at one end by a central derrick and at the other end by a carriage which moves on a circular track surrounding the derrick. All of the energy captured by the wind wheel is transmitted through the central axle to a vertical drive shaft mounted through the center of the derrick. The wheel is suspended from the derrick and the carriage track is separate from that of the wheel and is outboard thereof.

The patent to Berliner is directed to a rotor for a helicopter type structure. It includes a plurality of radial blades that are braced with rods and tension wires. The rotor is intended to be driven to rotate in a horizontal plane by a motor mounted to rotate about a vertical axis and does not function to extract energy from the wind.

The patent to Brauser et al is of relatively recent issue and is directed to a large cylindrical wind wheel mounted to rotate about a vertical axis. This machines does recognize the need of presenting a relatively large area to the wind for producing the rotation of the structure. The lateral forces due to the wind acting on the structure are taken up by a plurality of guy wires attached to its top.

A number of large wind driven, propeller type generators have been reported in the press in recent months. These include a large wheel being built by Boeing for NASA and one built at the Illinois State Fair in August of 1979. Each of these devices have relatively long thin blades and are adapted to rotate at relatively high speeds. The cross sectional area of the blades presented to the wind is relatively small compared to the total area of the circle described by the plane of rotation.

Some devices for using wind power for home use are now commercially available. Two such devices are described in the Fall and Winter catalog entitled "The Mother's Book Shelf". One device described in this catalog is a wind wheel mounted on a vertical shaft and disposed to rotate in a vertical plane about a horizontal axle supported by the shaft. The wind wheel has a perimeter structure to which a drive belt is connected to drive an electric generator. The energy generated by the wheel is taken off by a drive belt around the circumference. All of the weight of the wheel is supported at the axle by the vertical shaft. A plurality of guy wires are attached to the vertical shaft to absorb the lateral thrust loads due to the wind.

The conventional wind wheel as exemplified above generally is disposed to rotate in a vertical plane about a horizontal axis. The wind wheel itself usually is supported by a horizontal hub or axle and the power generated generally is taken off at the hub or axle. The towers or scaffolds used for supporting such wind wheels must be sufficiently strong to resist side forces as well as support both the weight of the wheel and the weight of whatever power takeoff means are attached to the axle. The supporting structure capable of meeting these requirements in a cost-effective manner thus becomes one constraint on the design of an efficient wind wheel system.

The fact that power is generally taken off at the hub or axle poses another serious constraint. As the size and power of such wheels increase, the torquing stress about the hub or axle also rapidly increases. This in turn requires even stronger and more massive structural support to be added to the center of the wheel. The strength to weight ratio of the materials used quickly place an upper limit on the size and therefore the power generating capability of such a wind wheel.

In addition, the actual angular velocity around the hub is relatively low. In general, the larger the diameter of the wheel, the lower will be this angular velocity, and the greater will be the loss in efficiency due to conversion. To convert this low angular velocity into useful form, as for driving a generator, a large and expensive gear train is required. This in turn adds to the weight at the hub as well as its cost.

OBJECTS OF THE INVENTION

A principal object of my invention is to provide a wind turbine of greater efficiency and reliability and reduced cost relative to known wind turbines.

A further object of my invention is to provide a wind turbine comprising a wheel having a rim, a hub and a plurality of soft airfoils carrying spindles mounted to the wheel between the rim and the hub, a moveable carriage underlying the wheel for supporting substantially all of its weight at the rim and means spaced from the carriage and located upwind of the wheel for securing it against tipping.

Another object is to provide a wind turbine having a wheel with a rim supported by a moveable carriage during rotation of the wheel and means spaced from the wheel and carriage for preventing shifting of the rim relative to the carriage.

Still another object is to provide a wind turbine having a wheel mounted to a moveable carriage, and a hub connected through an elongate axle to a vertical support member having a passageway for control elements between the hub and the vertical support member.

Yet another object of my invention is the provision of a soft airfoil wind turbine with a wheel having a hub and a rim, an elongate axle secured to the hub and extending therefrom in a downwind direction to a distal end spaced from the hub by a distance at least one-third of the radial distance between the hub and the rim and means for supporting the wheel including a plurality of stays interconnecting the distal end of the axle to the rim.

Yet a further object of my invention is to provide a soft airfoil wind turbine with a wheel having a rim, a rigging frame fixedly mounted to the wheel at the rim and extending therefrom in a downwind direction and means located downwind of the wheel for supporting the rigging frame on the wheel.

BRIEF DESCRIPTION OF THE DRAWINGS

The foregoing objects will be described in greater detail and further objects, features and advantages will become apparent in the following detailed description given in conjunction with the several figures of the drawings, in which:

FIG. 1 is a perspective view of the entire wind wheel system shown with sails furled;

FIG. 2 is a partial plan view of the wind wheel and supporting carriage assembly taken on line 2—2 of FIG. 1;

FIG. 3 is an enlarged, fragmentary longitudinal sectional view of the internal structure of the hub of the wheel taken on line 3—3 of FIG. 2;

FIG. 4 is an enlarged, fragmentary view of a portion of the perimeter rigging structure of the wheel showing a traveler rail and part of the sheeting for a sail taken on line 4—4 of FIG. 2;

FIG. 5 is a fragmentary view similar to FIG. 4 showing one of the sails unfurled and located in two positions;

FIG. 6 is an enlarged view of an outhaul block for one of the sails, or soft airfoils taken on line 6—6 of FIG. 5;

DETAILED DESCRIPTION

Figure 7:
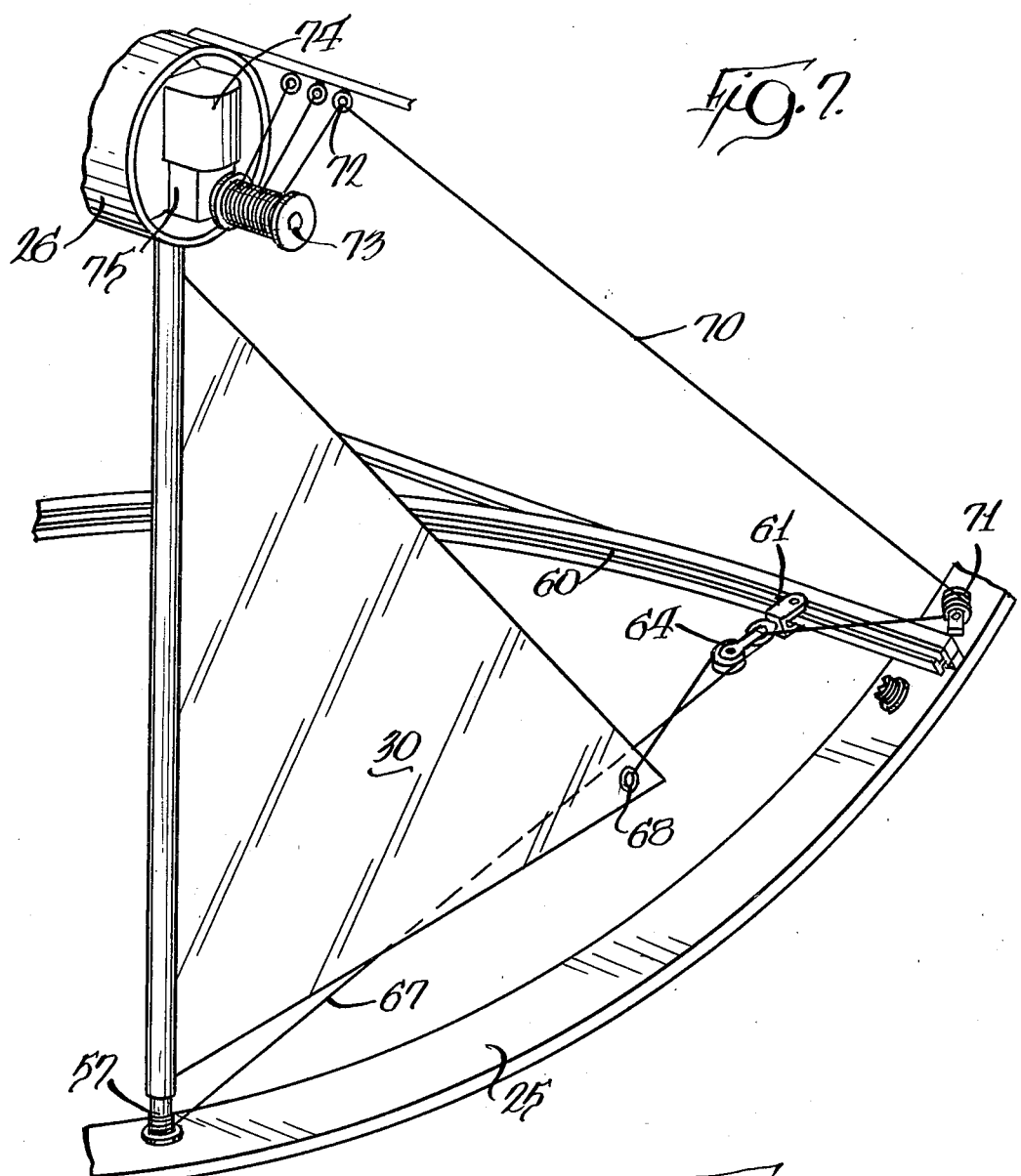
FIG. 7 is a fragmentary perspective view of part of the sheeting for unfurling one sail.

In the following detailed description of a preferred embodiment of my wind turbine and method of power generation like parts are designated with like numerals.

Referring first to FIG. 1, my wind turbine 10 comprises a stationary vertical mast, or pylon, 11, a horizontal boom or axle 12, a vertical power drive wheel 13, and a carriage assembly 14 for supporting the wheel 13. The pylon 11 is mounted perpendicular to the horizontal surface 16 and is supported by a plurality of guy wires 17 attached to ground anchors 18 arrayed in a circular pattern, around the central pylon 11. The pylon 11 is stayed to resist lateral forces on the wheel 13 and supports little, if any, of the weight of the wheel 13 and boom 12. A circular path or raceway 20 for the carriage 14 is defined on the surface 16 outside of the ground anchors 18. No special rails or trackage is required; merely a firm, level surface will do. The boom or axle 12 is rotateably attached to the top of the pylon 11 by means of a right angle connector 21 pivotally mounted to the pylon 11. The connector 21 permits rotation of the boom 12 in a horizontal plane around the vertical axis of the pylon, and also permits rotation of the boom 12 about its own axis. The connector 21 may also be provided with necessary slip rings and brush connections 22 and 23 (FIG. 3) so as to allow necessary electrical contact with the wind wheel assembly 13 and carriage 14. As seen, the upwind portion of axle 12 has a passageway 12" extending its entire length between the hub 26 of the wheel and the connector 21.

It should be noted that while the boom or axle 12 is generally horizontal, it is presently preferred to have the boom canted slightly downward at the distal tip 19 for greater stability and to assure the wheel 13 carries the weight for good traction of rim surface 28 with drawn power take-off wheels 42 and 43. Elongate braces 19' interconnecting the carriage 14 to the connector 21 are provided to prevent lateral shifting of wheel 13 relative to the carriage assembly 14. Elongate cables 19" interconnect the rim 25 to the distal end 19 via rigging frames 31 and 32 to support the wheel structure and rigging frames. The distal end of the downward portion of axle 12 may also be provided with a bearing-mounted anchor fixture to which tension members extending from points on the carriage 14 may be attached, in order to prevent the turbine wheel 13 from "climbing over" the driven wheel 42 and jumping off the carriage 14.

The wheel 13 comprises an outer rim 25, a central hub 26 and a plurality of uniformly spaced radial spindles 27 arranged as spokes of the wheel 13. The central hub 26 is located approximately in the center of the length of the boom 12 between the upwind and downwind portions thereof and has its axis coincident with the boom 12. The outer cylindrical surface 28 or the rim 25 provides a driving traction surface and may be coated with a suitable material effective to establish friction engagement with driven wheels on the carriage assembly 14. The spindles 27 are rotatable about their individual axes between the rim 25 and the central hub 26. A soft airfoil 30, such as a sail, is furled or wrapped around each of the individual spindles 27.

As shown in FIG. 1, two generally circular and parallel rigging frames 31 and 32 may be mounted on the rim 25. The rim 25 and the rigging frames 31 and 32 are all parallel and supported in place by a plurality of tension braces 33, and wheel stays 34 attached to the rim 25 and to the ends of the boom 12. As seen in FIG. 1, the distal end 19 of the downwind portion of the axle is spaced from the hub by a distance equal to at least one-third of the radius of the wheel. This distance has been found to be a sufficient distance for supporting the rigging frames 31 and 32. While this embodiment calls for one or more perimetral rigging frames, travelers and tracks, those assemblies may be eliminated by appropriate boom and rigging arrangements.

The spindles 27 provide little if any structural support for the wheel 13, since the main circular rim 25 is the primary compressive member in the wheel structure. This rim carries the horizontal boom member slung by cables 34 under tension which extend from points along the wheel perimeter to anchors on the boom or axle. The wheel may also carry spindles 27. This is advantageous in that, since the wheel, hub and boom are a rigid structure independent of the spindles, the spindle, sails and associated parts or mechanism may be independently repaired, removed or replaced without requiring dismantling the entire wheel. The result is low downtime for sail or spindles replacement.

Figure 9:
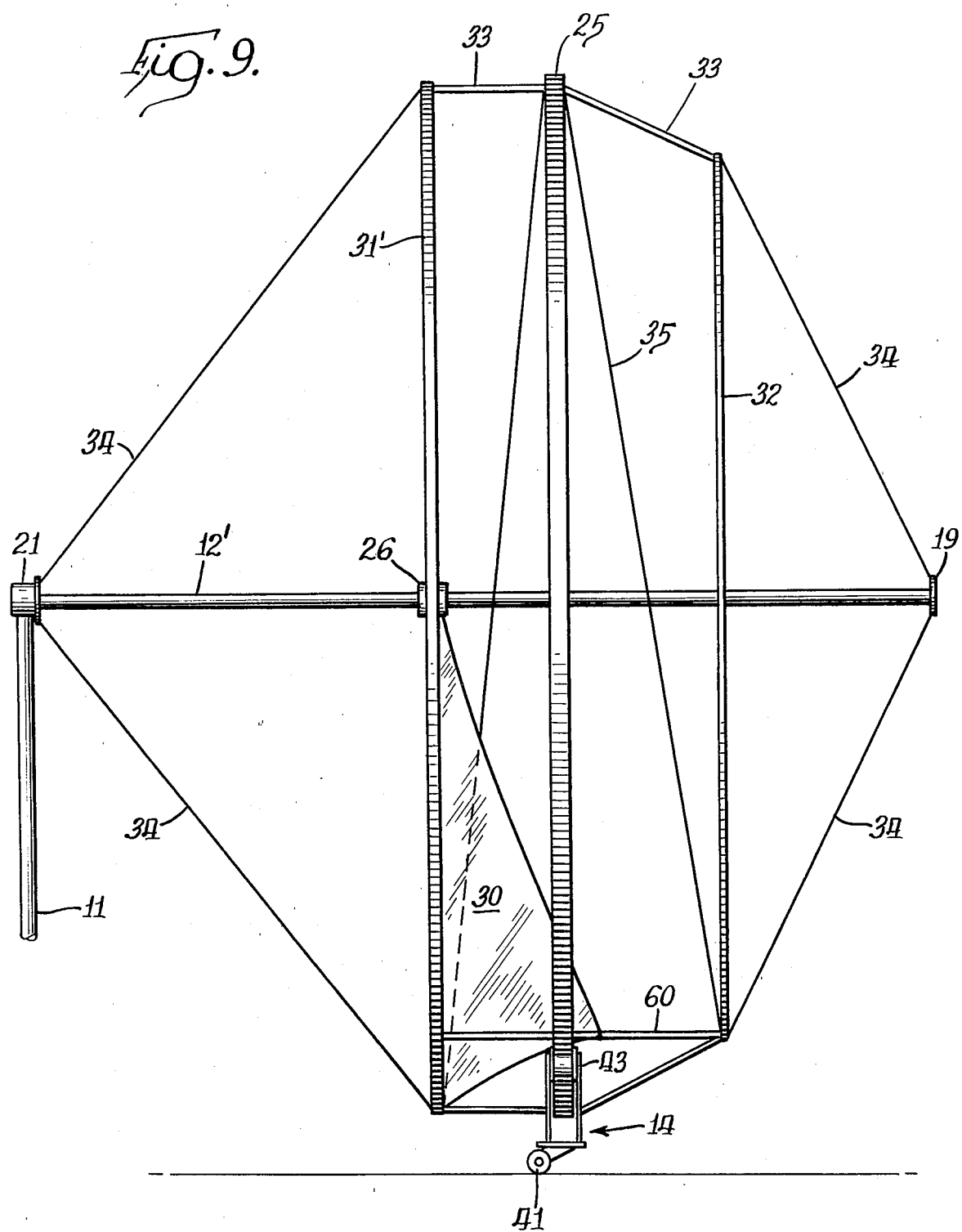
FIG. 9 is a side elevation view of an alternate embodiment in which the first, windward frame carries the spindles and sails, and the power driving wheel rim is spaced leeward or downwind thereof for balance and to act as an anchor for the traveler tracks.

As seen in FIG. 1, the rigging frames 31 and 32 are both on the leeward side of the main wheel 13, and that this main wheel carries the spindles 27. In FIG. 9, a "balanced" wheel system, the presently preferred system, is shown, with the first mast journalling "rigging" frame 31 being windward of the main wheel 31 and the second, rigging frame 32 being to leeward. In this embodiment, the first frame 31 carries the spindles 27 with sail 30 shown unfurled and sheeted in to about a 45 degree angle to the wind direction. The carriage 14 underlies the main wheel 13. In this embodiment the boom 12 is replaced by a tubular axle 12'. Rigging frame support cables 35 carry the weight of the rigging frames 31 and 32 to the main weight bearing rim 25. While only two such stays 35 are shown to illustrate support in the downward direction, it should be understood that an entire system of stays is provided, which stays are spaced evenly around the rim 25 to the corresponding points on the rigging frames 31 and 32.

As best seen in FIG. 2, the carriage assembly 14 is a generally elongate frame structure 40 supported by a plurality of tracking wheels 41. The wheels 41 are in engagement with the path or raceway 20 and are constrained by elongate brace 19 to carry the wheel 13 and carriage 14 in a circular path around the central pylon 11 by virtue of the common pivotal axis of the plane of the wheel 13 and the pylon vertical axis. The driven power take off wheels 42 and 43 are mounted in a vertical plane on the top of the frame 40 near the two ends thereof. The wheels 42 and 43 engage the surface 28 of the rim 25 and support most of the weight of the wheel assembly 13 and the boom 12. The wheels 42 and 43 may be connected to drive electrical generators 44 and 45, respectively, or may be connected to other suitable energy translating devices. While only two driven wheels 42 and 43 are shown, it is contemplated that a multiplicity of driven wheels might be employed. These wheels could be connected to generators that might be cut in as desired, or as additional energy may be available.

The carriage assembly 40 also includes an idler wheel 47 and a splash pan or doctor-type blade 48 located immediately ahead of the driven wheel 42. The idler wheel 47 serves as a stripper wheel or squeegee in inclement weather for removing water from the traction surface 28 so as to prevent slippage on the driven wheels 42 and 43.

The internal structure of hub 26 is shown in FIGS. 2 and 3. It is to be understood the mechanism shown and described is exemplary only and that other potential mechanisms might be employed to provide the same function. The spindle 27 are seen to be positioned at equal angular distances and project radially outward from the hub 26. Each of the spindles 27 is journalled at the rim 25 and at the hub 26 for rotation about its individual axis.

A spindle 27 has a shaft 50 projecting into the interior of a gear box 51 mounted within the hub 26. The shaft 50 may carry on its interior end a bevel gear 52 in mesh with another bevel gear 52. The collective gear boxes 51 are adapted to be driven by a continuous chain or gearing arrangement 53. An electric motor 54 is connected to drive a gear reduction box 55 which in turn drives the gearing arrangement 53. When the motor 54 is actuated the gear reduction box 55 provides the driving torque through the gearing arrangement 53 so as to turn all the spindles 27 in unison for furling and unfurling the sails 30.

As seen in FIG. 3, control elements, such as element 15', may extend through passageway 12" of axle 12, a passageway 21' in connector 21 and a passage 11' in mast 11 to the base of mast 11.

Referring now to FIGS. 4 and 7, a section of the wheel rim 25 and corresponding sections of the rigging frames 31 and 32 is illustrated. Each of the spindles 27 is formed at its outer end with a drum surface 57. The rigging frames 31 and 32 are multi-sided polygons and smaller in diameter than the rim 25. A plurality of traveler rails or tracks 60, one for each spindle 27, are mounted on and intersect the rim 25 and the rigging frames 31 and 32. Each track 60 is curved in an approximately circular arc and lies in a plane perpendicular to the spindle 27, and may be so constructed as to describe as much as 90 degrees or more of arc. The track 60 is generally in the shape of an "I" beam in cross-section and is tilted to lie in the plane defined.

Referring now also to FIG. 6 for more detail, a generally "U" shaped traveler block 61 has inwardly mounted rollers 62 which engaged an interior undersurface 63 of the track 60. The traveler 61 is connected to an outhaul block 64 by means of a link 65. The block 64 has a sheave 66 which receives a line 67 attached at one end to a clew grommet 68 on a sail 30. The other end of the line 67 is fed through the outhaul block 64 and returns through a fair-lead 69 to the drum surface 57 on the spindle 27. The drum surface 57 serves as a capstan for winding and unwinding the line 67 as the sail 30 is unfurled and furled.

Referring to FIGS. 2, 4 and 7, the plane defined by the arc 60 is positioned at the height of the clew 68 of the associated sail 30. This insures that the point of attachment of the clew 68 is congruent with any locus along the arc of the track 60.

A control sheet 70 (FIGS. 4, 5 and 7) is attached at one end to the traveler 61 and is reeved through a fair-lead 71 attached to the rim 25 and through a second fair-lead 72 (FIGS. 3 and 7) attached to the hub 26 and is wound on a capstan 73. The capstan 73 is driven by an electric motor 74 through a gear reduction box 75 which also contains an overload release clutch 76. The electrical energy for operating the motor 74, and the motor 54, is provided through the slip ring and brush contacts 22 located at the end of the boom 12 (FIG. 3). It is to be understood that the sheet 70 for all the sails 30 are wound and unwound from the capstan 73 in unison. Actuation of the motor 74 to wind and unwind the sheet 70 serves to permit positioning of the traveler 61 and the set of the sail 30 at any point on the length of the track 60. The track 60 thus provides a sheeting base along with a means by which the angle of the sail 30 may be positively controlled through any and all desired angles, from 0 degrees through the approximate 90 degrees described by the track 60 as best seen in FIGS. 5 and 7.

Figure 8:
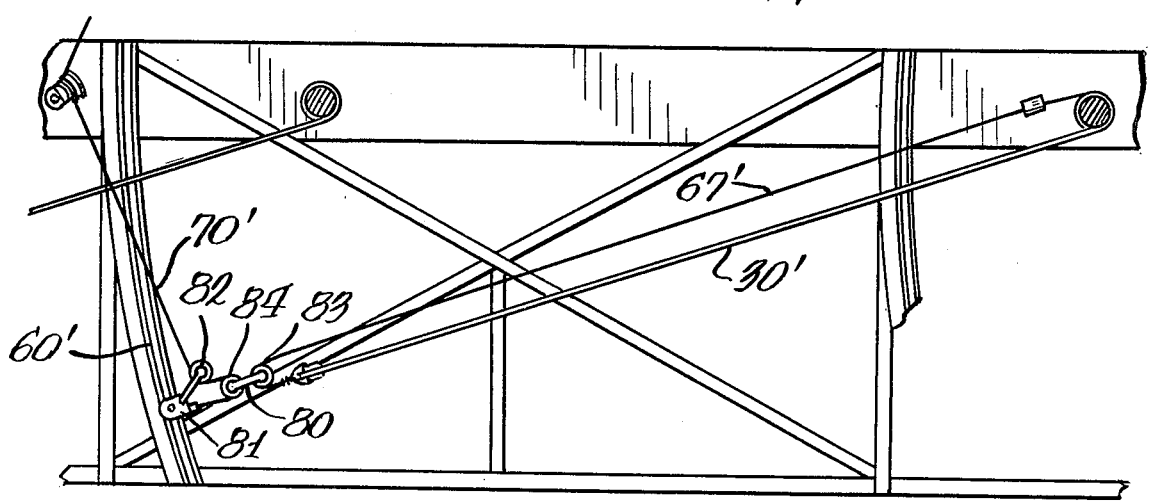
FIG. 8 is an enlarged fragmentary view similar to FIG. 4 illustrating an alternative embodiment in which a shortened guide rail is employed.

Referring now to FIG. 8. There is illustrated an alternative embodiment wherein the traveler track 60' is foreshortened to describe approximately 30 degrees of arc, and in this embodiment the rigging frame 32 can be eliminated. In this embodiment it is contemplated that the pitch of the sails 30' can be adjusted by a double sheet arrangement as illustrated. This sheeting arrangement includes a double sheave outhaul block 80, a traveler 81, and a traveler pulley 82. The block 80 has an upper sheave 83 and a lower sheave 84. The upper sheave 83 serves the same purpose as the previously described sheave 66 of the block 64. A control sheet 70' is attached at one end to the traveler 81, reeved over the sheave 84 and under the traveler pulley 82 and attached at its other end to a capstan 73' as previously described. The block 80 thus permits double running of the sheet 70' so that the sail 30' can luff out past the end of the track 60'. In certain applications, e.g., where there are very stable prevailing wind conditions, the track 60' and the traveler 81 may be eliminated. In this example, pulley 82 and sheet 70' are attached to rigging frame 31 so as to set the airfoil 30' at a predetermined optimum angle; this still allows the sail to luff out when desired.

In operation, the wind wheel system 10 functions as follows:

The carriage 14 may be moved initially to position the wheel 13 on the leeward side of the pylon. The motor 54 is then actuated setting in motion the gear train 53 which causes the spindles 27 to rotate and permit unfurling of the sails 30. The rotation of the spindle 27 causes the outhaul line 67 to be wound on the drum 57 and simultaneously causes the sail 30 to unfurl in the direction of the track 60 in a closed loop. The amount that the sails 30 are unfurled can be controlled according to the prevailing wind conditions. Once the sails 30 are unfurled to the desired amount, the motor 74 is actuated to operate the sheet capstan 73. The capstan 73 shortens or lengthens the control sheet 70 for establishing the desired angle of the sail 30, as illustrated in FIG. 5. The sheeting capstan 73 thus maintains tension on the sail 30 as well as controls the sail's angular relationship to the incident wind by hauling in or letting out the traveler 61 along the track 60.

As described earlier, the sheeting capstan 73 is driven through an overload release clutch 76 contained in the gear reduction box 75. The engagement tension of the control sheet 70 is established so that should a strong gust of wind raise the tension in the sheet 70 and thus the torque on the sheeting capstan 73 above a pre-determined acceptable level, the overload release clutch 76 releases the capstan 73 allowing sheets 70 to run out and luff the sails 30. The clutch 76 automatically re-engages to drive the capstan 73 and take in the sheet 70 for resetting the sails 30. The force acting against the unfurled sails 30 sets the wheel 13 in motion about its horizontal axis which is co-incident with the horizontal boom 12.

As the wheel 13 rotates, the outer traction surface 28 of the rim 25 engages and drives the wheels 42 and 43. These wheels in turn drive the generators 44 and 45 for thereby extracting energy from the wheel 13. In the event that moisture accumulates on the traction surface 28, the stripper wheel 47 serves as a squeegee to remove such moisture. The moisture so removed is deflected by the splash pan 48 so that it does not reach the traction wheels 42 and 43. In the event the wind shifts direction with respect to the pylon, the wind turbine 13 can be permitted to free-wheel on the raceway 20 to assume the preferred wind direction. This is because in this design the airfoils are rotating in a plane which is always to leeward of the turbine assembly's pivot or anchor point, rather than to windward as is the case with most rigid blade designs. Propeller-blade type turbines are generally constructed to hold the blades windward of the tower or pylon which supports the unit, usually by means of a large vane or "tail", so that the blades will now be "shaded" by the supporting structure. In the present invention, this does not occur since the airfoils are relatively large in area compared to the pylon, and because they are a sufficient distance downwind so that the pylon's induced turbulence has subsided.

It is contemplated that wind turbines up to 300 feet in diameter may be constructed according to the principles of this invention. It is further contemplated that a wind turbine of this design will rotate at a relatively low angular velocity, compared to some of the bladed propeller designs currently proposed or under construction. The energy extracted from the wind by this invention should be several times greater than that derived from the bladed propeller designs, simply because of the greater effective area presented transversely to the wind. For example, a 40' wheel of this invention would have an output of about 240 kw at a wind speed of 30 m.p.h.

The large revolving traction rim may be considered analagous to a very large driving gear, and the support wheels in frictional engagement therewith may be considered as small diameter driven gears. The resultant multiplication of angular speed to a usable lever can be very large. Also, this type of gearing arrangement is significantly simpler, lighter and less expensive than the axially driven gear multiplication devices. The dimensions involved make the driving arrangement almost comparable to rack and pinion. The frictional engagement described in fact could be replaced by positive engagement devices such as gear, or chain drives, or the equivalent.

Assuming that the wind wheel is used to drive one or a plurality of electrical generators, the energy developed by the wheel can be extracted continuously by successively cutting-in additional generators—up to the limit of available energy. The effective operation of the wheel does not depend on any maximum or minimum speed of rotation (other than zero). The system of this invention also has an excellent "turndown" capability. That is, it can produce varying levels of power (e.g., electricity) to follow demand peaks and valleys throughout the day by cutting in or out the number of generators having power-take-off wheels in contact with the rim 25. For example, the power take-off wheels can be arranged in a whipple tree assembly and cut in or out one at a time or in groups as more or less power is required. Further, the run speed, and therefore power frequency, can be controlled by sail adjustment.

The improved wind wheel of the present invention thus can serve as a continuous source of energy under a variety of wind and weather conditions, so long as some wind is present. Relatively stable rotational angular velocity can be maintained because of the ability to alter both the exposed areas of the sails and their incident angle to the wind, and the angular momentum of the wheel itself.

It should also be noted that the embodiment shown and described contemplates that the sails 30 when fully extended will completely cover the disc area of the wheel 13. It is contemplated the design can be additionally modified so as to provide for some overlap of the sails. This should result in the exposure of still greater airfoil area and further increase the drive force generated. In this regard, the wind turbine of the present invention is relatively so light, in terms of mass per kw generated, that it can operate at relatively low wind speeds to produce an output of useful power. D.C. generators may be used for various industrial processes, e.g., production of hydrogen, fertilizer, and various electrolytic or resistance heating processes.

It is to be understood that the embodiments shown and described are by way of being preferred examples and that many changes and modifications can be made thereto without departing from the spirit of the invention. For example, the rim 25 may be formed with gear teeth to engage a gear type power take-off wheel. Likewise, the mast drum and outhaul line may be located at the hub end of the mast rather than the rim end.

It should be understood that various modifications within the scope of this invention can be made by one of ordinary skill in the art without departing from the spirit thereof. I therefore wish my invention to be defined by the scope of the appended claims as broadly as the prior art will permit, and in view of this specification if need be.

I claim:

1. A wind turbine, comprising:
   (a) a vertically oriented wind turbine wheel having a rim structure, a generally horizontally oriented axle assembly including a hub suspended from said rim structure, and having means for carrying a plurality of soft airfoils disposed on spindles extending between said hub and said rim structure;
   a moveable carriage underlying and supporting the wheel at its rim during rotation and having means for taking-off power mounted in engagement with said rim structure; and
   (c) means spaced from the wheel and the carriage for constraining both the carriage and the wheel against movement other than along concentric circles, for preventing lateral shifting of the rim relative to the carriage, and for preventing the wheel from tipping, which constraining means includes a vertically extending pylon member anchored to ground spaced from and disposed upwind of both the wheel and the carriage, means for attaching the axle assembly to the vertical pylon member, and means for securing the carriage to the vertical pylon member.

2. The wind turbine of claim 1 in which said constraining and lateral shifting preventing means includes:
   a swivel connector for connecting the axle to the vertical pylon member for pivotal movement thereabout, and
   said carriage securing means includes at least one elongate stay attached at its one end to the carriage and attached at its other end to the swivel connector.

3. The wind turbine of claim 2 in which said axle assembly has an upwind end and rotates with the hub, and said wheel swivel connector means includes a rotary connector for connecting said upwind end of said axle assembly to said vertical pylon member.

4. The wind turbine of claim 3 wherein: said axle, swivel connector and vertical pylon member have a passageway therethrough for passage of control elements between the hub and the pylon member.

5. The wind turbine of claim 4 wherein said carriage securing means includes an elongate member interconnecting the swivel connector and the carriage for carrying control elements between the carriage and the swivel connector passageway.

6. The wind turbine of claim 5 wherein:
   (a) said axle assembly extends downwind of said wheel and terminates in a distal end thereof, said distal end being spaced from the hub by a distance equal to at least one-third of the radial distance between the hub and the rim;
   and which includes:
   (b) means for suspending said axle assembly from said wheel rim including a plurality of stays interconnecting said downwind distal end of said axle assembly to said rim structure.

7. The wind turbine of claim 5 in which the distance between the upwind end of said axle secured to said rotary connector and the hub is equal to at least one-third of the radial distance between the hub and the rim.

8. The wind turbine of claim 6 wherein said means for suspending said axle assembly includes a plurality of stays interconnecting the upwind portion of the axle assembly to the rim structure.

9. The wind turbine of claim 1 which includes a second rim disposed upwind from said rim structure, said airfoil spindles are journaled between said second rim, and a hub disposed in said axle assembly substantially in the plane of said second rim.

10. The wind turbine of claim 9 which includes a rigging frame fixedly mounted to said first rim on the downwind side thereof and having means for supporting unfurled portions of said airfoil downwind of said first rim.

11. The wind turbine of claim 10 which includes means for taking power off at least one of said second rim and said rigging frame.

12. A wind turbine, comprising:
   (a) a vertically oriented wheel having a rim structure and a generally horizontally oriented axle assembly including a hub suspended from said rim structure, said wheel having a downwind side and an upwind side;
   (b) a plurality of elongate spindles radially mounted to the wheel between the rim and the hub and respectively carrying a plurality of soft airfoils; and
   (c) a first rigging frame fixedly mounted to the wheel at its rim on the downwind side and extending therefrom in a downwind direction, said rigging frame having means for supporting the unfurled portions of said airfoils downwind of the wheel; and (d) means extending downwind of the rigging frame for supporting the axle by the wheel.

13. The wind turbine of claim 12 in which said axle assembly has one end attached to the hub on the downwind side of the wheel and extends in a downwind direction from the wheel to a distal end thereof located beyond the first rigging frame.

14. The wind turbine of claim 13 in which said supporting means includes a plurality of stays interconnected between the rigging frame and the axle for supporting the axle.

15. The wind turbine of claim 14 in which the distance between the distal end of the axle and the hub is at least as great as one-third of the radial distance between the hub and the rim.

16. The wind turbine of claim 12 in which said rigging frame carries a portion of a rigging system for controlling the position of the unfurled portion of the airfoils.

17. The wind turbine of claim 12 including a second rigging frame fixedly attached to the wheel on the downward side and extending therefrom in a downwind direction.

18. The wind turbine of claim 17 in which said first mentioned rigging frame and said second rigging frame carry a portion of a rigging system for controlling the position of the unfurled portions of the airfoils.

19. The wind turbine of claim 12 in which said first rigging frame carries a rigging system including, for each spindle,
(a) a traveler rail,
(b) a traveler block mounted on said traveler rail for movement therealong and attached to the airfoil by an outhaul line, and
(c) a sheet attached to said traveler block for controlling its position on the traveler rail.

20. The wind turbine of claim 16 which includes means for taking power off of said rigging frame.

* * * * *

UNITED STATES PATENT AND TRADEMARK OFFICE
CERTIFICATE OF CORRECTION

PATENT NO. : 4,350,895
DATED : September 21, 1982
INVENTOR(S) : Gregory E. Cook

It is certified that error appears in the above-identified patent and that said Letters Patent are hereby corrected as shown below:

In the Abstract, line 21, "are" should be changed to --is--;

Column 1, line 5, "SUMMARY" should be changed to --BACKGROUND--;

Column 3, line 1, before "OBJECTS OF THE INVENTION", please insert as a heading which is centered in all caps
--THE INVENTION--;

Column 3, line 39, before "BRIEF DESCRIPTION OF THE DRAWINGS", please insert the Summary of the Invention as follows:

--SUMMARY OF THE INVENTION

The invention comprises a large, relatively light weight wind wheel (turbine) system and method capable of efficiently capturing a high percentage of available energy from the wind in mechanical or electrical form. The wind wheel is pivotally attached to a vertical pylon by means of a horizontal boom or axle suspended from the wheel rim structure. The wheel assembly is free to move on a horizontal circular raceway around the central pylon.

The wheel comprises a perimeter rim structure and a plurality of radial rotatable spindles arranged in the manner of spokes outwardly from the boom or axle, which spindles are mounted at their outer end to the rim structure. Each of the spindles is rotatable on its individual axis and has a soft airfoil (sail) furled upon it.

The sails are controlled by rigging traveler tracks and the like which permit individual sails to be furled, unfurled and adjusted for pitch automatically to

UNITED STATES PATENT AND TRADEMARK OFFICE
CERTIFICATE OF CORRECTION

PATENT NO. : 4,350,895
DATED : September 21, 1982
INVENTOR(S) : Gregory E. Cook

It is certified that error appears in the above-identified patent and that said Letters Patent are hereby corrected as shown below:

accommodate for changing wind conditions, thereby optimizing wheel energy output. Means are provided for automatically luffing the sails when there is momentary overload, as from wind gusts.

The outer rim of the wheel has a traction surface and is supported by a carriage assembly. The carriage assembly has supporting driven wheels mounted thereon which engage the traction surface on the perimeter and are driven thereby. The driven wheels may be connected to drive one or more electrical generators or other suitable energy translating means. The number of driven generators may be increased or decreased to follow load patterns. The carriage carries most of the weight of the wheel, is constrained to move in a circular path around the central, vertical pylon (i.e., tethered to it), and can move freely to assume the preferred wind direction. Due to the rim power take off feature, the system of the present invention does not require large and complex gear systems to increase rotational speed to that of power generation. Further, the rotary momentum of the wind wheel permits more nearly continuous generation during gusty wind conditions. The wind wheel system may be controlled by a microprocessor responsive to wind conditions, load conditions, and power output.--

Column 4, line 25, "rotateably" should be changed to --rotatably--;

Column 4, line 66, "axes" should be changed to --axles--;

Column 5, line 23, "spindle" should be changed to --spindles--;

UNITED STATES PATENT AND TRADEMARK OFFICE
CERTIFICATE OF CORRECTION

PATENT NO. : 4,350,895

DATED : September 21, 1982

INVENTOR(S) : Gregory E. Cook

It is certified that error appears in the above-identified patent and that said Letters Patent are hereby corrected as shown below:

Column 5, line 24, "mechanism" should be changed to --mechanisms--;

Column 5, line 27, "spindles" should be changed to --spindle--;

Column 5, line 32, "mast" should be changed to --spindle--;

Column 5, line 33, the first occurrence of "31" should be changed to --31'--;

Column 5, line 33, the second occurrence of "31" should be changed to --25--;

Column 5, line 35, "31" should be changed to --31'--;

Column 5, line 38, "13" should be changed to --25--;

Column 5, line 41, "31" should be changed to --31'--;

Column 5, line 46, "31" should be changed to --31'--;

Column 6, line 12, "spindle" should be changed to --spindles--;

UNITED STATES PATENT AND TRADEMARK OFFICE
CERTIFICATE OF CORRECTION

PATENT NO. : 4,350,895

DATED : September 21, 1982

INVENTOR(S) : Gregory E. Cook

It is certified that error appears in the above-identified patent and that said Letters Patent are hereby corrected as shown below:

Column 8, line 46, "lever" should be changed to --level--;

Column 9, line 49, before "a moveable carriage" please insert --(b)--.

Signed and Sealed this

Twenty-fifth Day of October 1983

[SEAL]

Attest:

GERALD J. MOSSINGHOFF

Attesting Officer

Commissioner of Patents and Trademarks